United States Patent
Higuchi

(10) Patent No.: US 6,600,219 B2
(45) Date of Patent: Jul. 29, 2003

(54) NON-CONTACT DATA CARRIER

(75) Inventor: Takuya Higuchi, Tokyo (JP)

(73) Assignee: Dainippon Printing Co., LTD, Tokyo (JP)

( * ) Notice: Subject to any disclaimer, the term of this patent is extended or adjusted under 35 U.S.C. 154(b) by 0 days.

(21) Appl. No.: 10/030,450

(22) PCT Filed: May 7, 2001

(86) PCT No.: PCT/JP01/03815
§ 371 (c)(1),
(2), (4) Date: Apr. 1, 2002

(87) PCT Pub. No.: WO01/85469
PCT Pub. Date: Nov. 15, 2001

(65) Prior Publication Data
US 2002/0121685 A1 Sep. 5, 2002

(30) Foreign Application Priority Data
May 12, 2000 (JP) ........................................ 2000-140672

(51) Int. Cl.⁷ ............................................... H01L 23/02
(52) U.S. Cl. ........................................ 257/679; 257/680
(58) Field of Search ................................ 257/679, 680, 257/700, 723, 724

(56) References Cited
U.S. PATENT DOCUMENTS 6,259,158 B1 * 7/2001 Usami
6,265,977 B1 * 7/2001 Vega et al.
6,288,905 B1 * 9/2001 Chung
6,330,162 B2 * 12/2001 Sakamoto et al.
6,404,643 B1 * 6/2002 Chung
6,424,029 B1 * 7/2002 Giesler
6,437,985 B1 * 8/2002 Blanc

FOREIGN PATENT DOCUMENTS

| JP | 63-59595 | 3/1988 |
|---|---|---|
| JP | 10-069533 | 3/1998 |
| JP | 10-334203 | 12/1998 |
| JP | 11-031206 | 2/1999 |
| JP | 2000-067197 | 3/2000 |

* cited by examiner

Primary Examiner—Sheila V. Clark
(74) Attorney, Agent, or Firm—Rader, Fishman & Grauer PLLC

(57) ABSTRACT

A non-contact data carrier device has an upper layer pattern and a lower layer pattern having an antenna coil part made of wire pattern laid spirally and capacitor patterns. The upper and lower layer patterns are disposed on a surface and a back of a dielectric layer, respectively, in such a manner that the external forms of the respective antenna coil parts accord with each other so that a resonance circuit is formed. The non-contact data carrier device is provided with a portion of wire pattern of the antenna coil part which has the shape according to the external form of coil of data carrier chip. Data carrier chip is mounted on one of the portions of densely formed wire pattern in such a manner that a part of the shape of coil of data carrier chip conforms to the portion of densely formed wire pattern.

14 Claims, 9 Drawing Sheets

(A)

(B)

(A)

(B)

(C)

(A)

(B)

NON-CONTACT DATA CARRIER

TECHNICAL FIELD

The present invention relates to an art of non-contact data carrier. In particular, the present invention relates to a data carrier device with a data carrier chip or data carrier module taking the form of on-chip coil.

BACKGROUND OF ART

This sort of non-contact data carrier has memory in which various data can be stored, by which the control of non-contact data carrier can be made by means of non-contact communication with an external reader/writer. Therefore, the non-contact data carrier has been applied for various uses such as automatic sorting of packages with data carrier, control of goods in stock, prevention of theft of goods and others and production—and distribution control.

By the way, recently, trial products of data carrier chip or data carrier module taking the form of the so-called on-chip coil (with coiled antenna) are provided and a non-contact data carrier or a non-contact IC card with the data carrier chip or data carrier module is studied. In such a non-contact IC card or non-contact data carrier, a way of use in which the first coil (or booster antenna) for reception and an on-chip coil are not directly connected with each other, but are arranged relatively to each other is ordinarily employed.

A conventional example of non-contact data carrier device with on-chip coil is shown in FIG. 9. In the conventional example, the following method for supplying electric power from a booster antenna 51 to a data carrier chip taking the form of an on-chip coil 52 (the area surrounded by a frame shown by the dotted line) is employed: a booster antenna 51 is formed with a densely formed coil portion 51D and the data carrier chip taking the form of on-chip coil 52 is put on the densely formed coil portion 51D. In this case, the on-chip coil is mounted on the densely formed coil portion 51D in such a manner that the shape of on-chip coil accords with the shape of densely formed coil portion, to fabricate a data carrier. However, in this method, the most internal end of densely formed coil portion 51D is connected with the most external end of the first coil a through connection 51J. Therefore, it is needed to connect the most internal end of densely formed coil portion 51D with the connection 51J through a through hole or caulking precisely formed at the center of densely formed coil portion 51D.

In this case, booster antenna 51 is not connected directly with on-chip coil 52, since booster antenna 51 and on-chip coil 52 are correspond to the first coil and the second coil, respectively.

However, the on-chip coil has the small size with sides of about 3 to 5 mm, while the densely formed coil portion corresponding to the on-chip coil has also the small size. Accordingly, there is a problem that to form through hole at the center of the densely formed coil portion is the highly precise work, so that the yield of products is decreased because of the difficulty in the location of through hole.

Accordingly, it is an object of the present invention to provide a data carrier device comprising the structure of antenna in which there is a no problem in the location of a through hole in the above-mentioned non-contact data carrier.

DISCLOSURE OF THE INVENTION

In order to the above-mentioned problem, a first non-contact data carrier device according to the present invention is a non-contact data carrier device comprising an upper layer pattern having an antenna coil part made of wire pattern laid spirally and capacitor patterns and a lower layer pattern having, in a same way, an antenna coil part made of wire pattern laid spirally and capacitor patterns, wherein the respective antenna coil parts have almost the same external forms, and wherein the upper and lower layer patterns are disposed on a surface and a back of a dielectric layer, respectively, in such a manner that at least the external forms of the respective antenna coil parts accord with each other so that a resonance circuit is formed, characterized in that a part of each antenna coil part includes a portion which has the shape according with the external form of coil of a data carrier chip with on-chip coil and has a densely formed wire pattern, and that the data carrier chip is mounted on one of the portions of densely formed wire pattern in such a manner that the coil of data carrier chip partially conforms to the external form of the densely formed wire pattern. Since a data carrier device of the present invention is formed as mentioned hereinabove, the data carrier device using data carrier chip with on-chip coil has high efficiency of magnetic connection and can be produced with high yield of products.

A second non-contact data carrier device according the present invention is a non-contact data carrier device comprising an upper layer pattern having an antenna coil part made of wire pattern laid spirally and capacitor patterns and a lower layer pattern having, in a same way, an antenna coil part made of wire pattern laid spirally and capacitor patterns, wherein the respective antenna coil parts have almost the same external forms, and wherein the upper and lower layer patterns are disposed on a surface and a back of a dielectric layer, respectively, in such a manner that at least the external forms of the respective antenna coil parts accord with each other so that a resonance circuit is formed, characterized in that a part of each antenna coil part includes a portion which has the shape according with the external form of coil of a data carrier module with on-chip coil and has a densely formed wire pattern, and that the data carrier module is mounted on one of the portions of densely formed wire pattern in such a manner that the coil of data carrier module partially conforms to the external form of coil of the densely formed wire pattern. Since a data carrier device of the present invention is formed as mentioned hereinabove, the data carrier device using a data carrier module with on-chip coil has high efficiency of magnetic connection and can be produced with high yield of products.

A third non-contact data carrier device according to the present invention is a non-contact data carrier device comprising an upper layer pattern having an antenna coil part made of wire pattern laid spirally and capacitor patterns and a lower layer pattern having, in a same way, an antenna coil part made of wire pattern laid spirally and capacitor patterns, wherein a part of each antenna coil part of the respective layer patterns includes a portion which has the shape according with the external form of coil of a data carrier chip with on-chip coil and has a densely formed wire pattern, and wherein the respective parts of antenna coil are formed into forms such that at least both the antenna coil parts are engaged with each other in the manner that one antenna coil is engaged with another antenna coil outward or inside another coil pattern except the respective capacitor patterns and the respective densely formed wire patterns, wherein the forms of capacitor patterns and the forms of densely formed wire patterns of both the layer patterns are almost the same, and wherein the upper and lower layer patterns are disposed on a surface and a back of a dielectric layer, respectively, in such a manner that the upper and lower layer patterns correspond to each other so that a resonance circuit is formed, characterized in that the data carrier chip is mounted on one of the portions of densely formed wire pattern in such a manner that the data carrier chip partially conforms to the external form of coil of the densely formed wire pattern. Since a data carrier device of the present invention is formed as mentioned hereinabove, the data carrier device using an on-chip coil typed data carrier chip has high efficiency of magnetic connection can and be produced with high yield of products.

A fourth non-contact data carrier device according to the present invention is a non-contact data carrier device comprising an upper layer pattern having an antenna coil part made of wire pattern laid spirally and capacitor patterns and a lower layer pattern having, in a same way, an antenna coil part made of wire pattern laid spirally and capacitor patterns, wherein a part of each antenna coil part of the respective layer patterns includes a portion which has the shape according with the external form of coil included in a data carrier chip with on-chip coil and has a densely formed wire pattern, wherein the respective parts of antenna coil are formed into forms such that at least both the antenna coil parts are engaged with each other in the manner that one antenna coil is engaged with another antenna coil outward or inside another coil pattern except the respective capacitor patterns and the respective densely formed wire patterns, wherein the forms of capacitor patterns and the forms of densely formed wire patterns of both the layer patterns are almost the same, and wherein the upper and lower layer patterns are disposed on a surface and a back of a dielectric layer, respectively, in such a manner that the upper and lower layer patterns corresponds to each other so that a resonance circuit is formed, characterized in that the data carrier module is mounted on one of the portions of densely formed wire pattern in such a manner that the data carrier module partially conforms to the external form of coil of the densely formed wire pattern. Since a data carrier device of the present invention is formed as mentioned hereinabove, the data carrier device including a data carrier module with on-chip coil has having high efficiency of magnetic connection and can be produced with high yield of products.

BEST MODE FOR CARRYING OUT THE INVENTION

Referring to drawings, a non-contact data carrier device of the present invention is explained.

[First Mode of the Present Invention]

Figure 1:
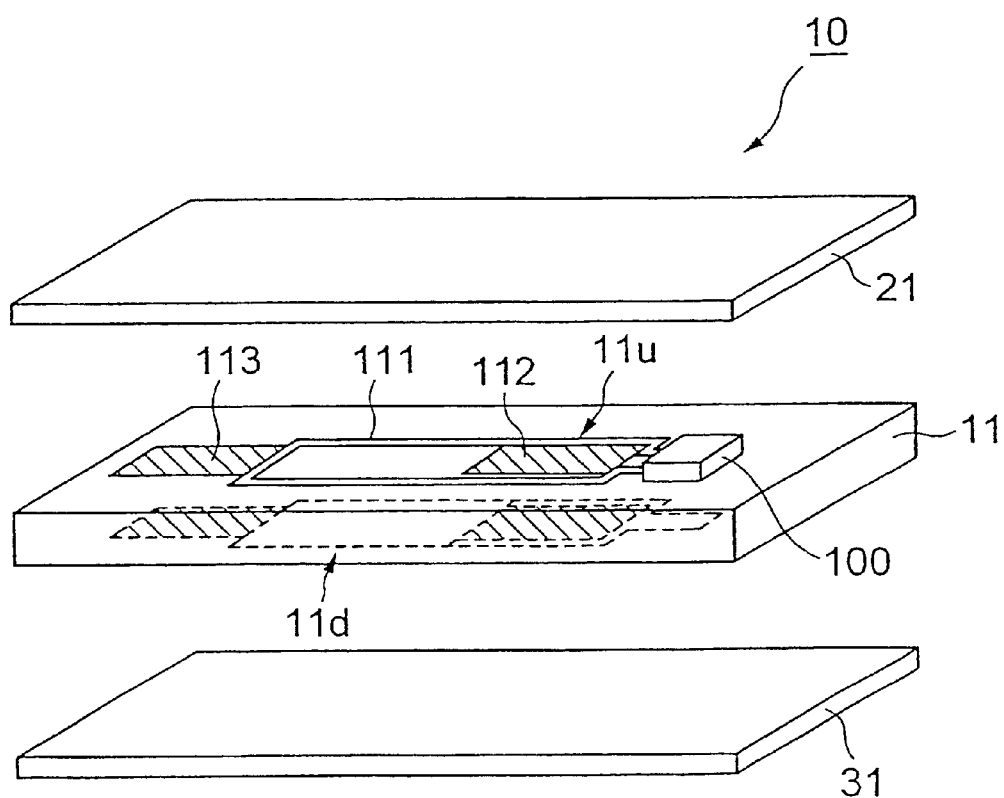
FIG. 1 is an exploded perspective view of a first mode of the present invention.

FIG. 1 is an exploded perspective view of the first mode of the present invention. As shown in FIG. 1, a non-contact data carrier device is usually comprised of antenna sheet 11 having an antenna coil parts and capacitor patterns, and upper and lower protective sheets 21, 31 for protecting the antenna sheet. Antenna sheet 11 is made of insulating substrate wherein an upper layer pattern 11u and a lower layer pattern 11d having antenna coil parts 111 and capacitor patterns 112, 113, respectively, are formed on both sides of the antenna sheet to form a LC resonance circuit. Data carrier chip or data carrier module 100 taking the form of on-chip coil is mounted on specified position in antenna coil part 111. Various kinds of information are stored into a memory of the data carrier chip or data carrier module.

Material of a substrate of antenna sheet 11 is selected according to the object of use of data carrier, wherein a sheet of hard polyvinyl chloride, a sheet of polyester (PET), a sheet of polyimide, a sheet of glass epoxy resin and others, which have usually insulation property and act also as dielectric layers, are used as the materials of antenna sheet. The thickness of antenna sheet is 20 to 150 $\mu$m, preferably of 25 to 100 $\mu$m. Material composed of the substrate and foil of aluminum, Cu or iron with thickness of 5 to 50 $\mu$m laminated on both sides of the substrate is used wherein the foil of aluminum, Cu or iron is etched into the desired form to form the antenna coil part and a capacitor pattern.

The same material as material of a substrate of antenna sheet 11 can be applied for protective sheets 21, 31, however low-priced material as paper can be also used. Generally, there are many cases where a data carrier device is used in the production or the process of distribution. Therefore, ornamental element is not much needed for the protective sheets except a case where the data carrier device is used with being carried as commuter pass. Since a data carrier device of small dimensions is desired except a case where the data carrier device is used for the special object, the data carrier device is produced in the size of unit less than 50 mm×50 mm under ordinary circumstances.

Figure 2:
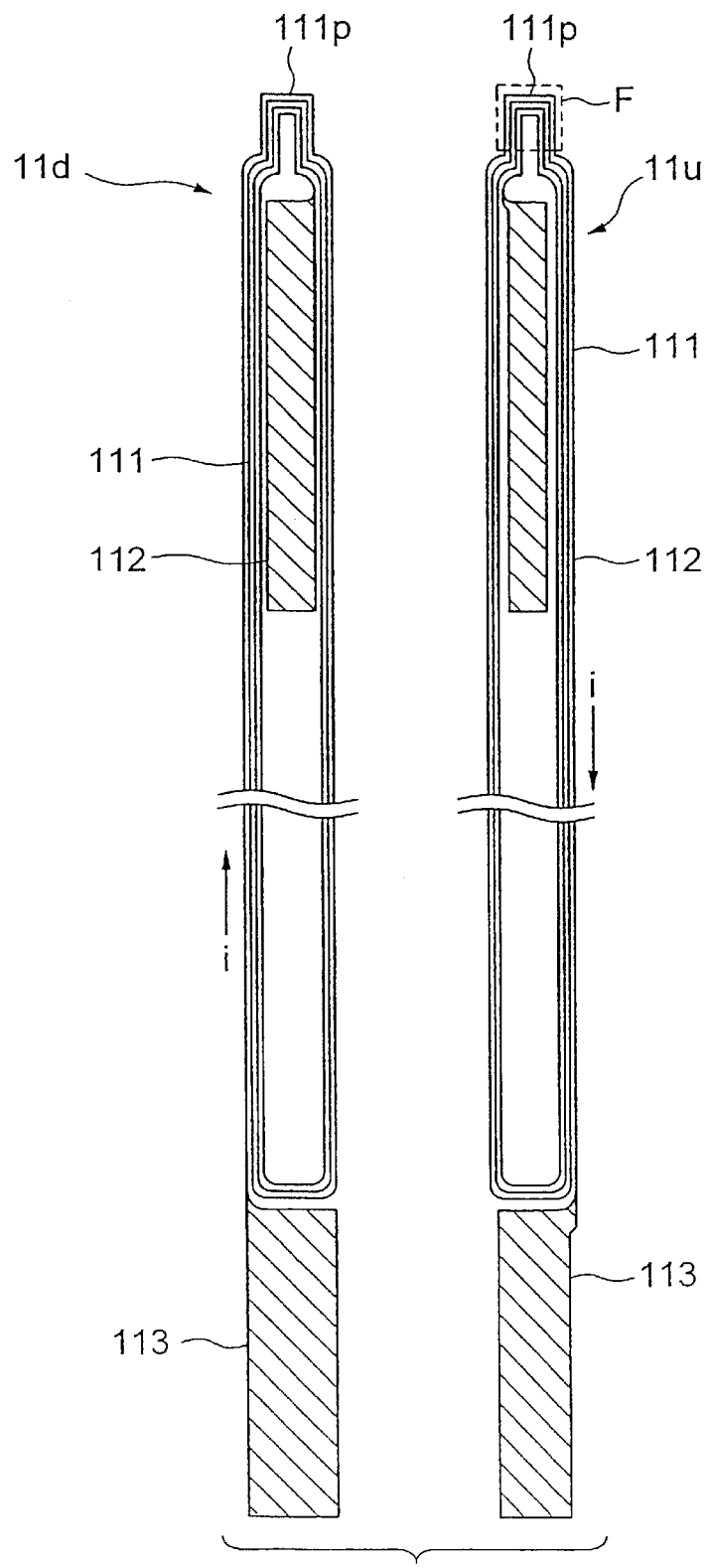
FIG. 2 is a view of one example of an upper layer pattern and a lower layer pattern formed into an antenna sheet.

FIG. 2 is a view showing one example of an upper layer pattern and a lower layer pattern formed on an antenna sheet.

In the first mode of data carrier device of the present invention, upper layer pattern 11u and lower layer pattern 11d are put on both sides of the substrate of antenna sheet so that at least the external forms of the respective layer patterns accord with each other seeing in the vertical direction. Accordingly, FIG. 2 shows a state where upper layer pattern 11u and lower layer pattern 11d are juxtaposed on right and left sides with being separated from a state where at least the external forms of the respective layer patterns accord with each other seeing in the vertical direction.

Upper layer pattern 11u and lower layer pattern 11d have antenna coil part 111 and capacitor patterns 112, 113, respectively. The capacitor patterns are comprised of capacitor pattern 112 arranged inside antenna coil part 111 and another capacitor pattern 113 arranged outside antenna coil part 111. The external form of antenna coil parts 111 of the upper and lower patterns are the same or nearly the same, wherein the winding directions of wound lines of the upper and lower layer patterns are opposite to each other in such a manner that if the winding direction of wound line of the upper layer pattern is clockwise, the winding direction of wound line of the lower layer pattern is counterclockwise. This is because winding directions of both the wound lines should be set in such directions that the magnetic flux of the upper layer pattern and the magnetic flux of the lower layer flux does not cancel with each other since the directions of electric currents are opposite to each other in the upper and lower antenna coil parts 111.

Winding directions of both the wound lines are opposite like this. In this case, if the winding number of both the wound lines or wire pattern of antenna coil parts is identical, the respective linear patterns in antenna coil parts can be arranged substantially at the same positions seeing in the vertical directions. Accordingly, it is preferable that both the layer patterns are put on both sides of the antenna sheet in such a manner that the external forms of antenna coil parts as well as the wire patterns of antenna coil parts in both the layer patterns accord with each other seeing in the vertical direction, because magnetic flux density produced by both the wire patterns of antenna coil parts can be made still higher thereby.

Portions of antenna coil parts 111 are provided with portions 111*p* of densely formed antenna lines with the form according with the external forms of on-chip coil of data carrier chip or data carrier module mounted on the antenna coil part.

In this case, "portions 111*p* of densely formed antenna lines with the form according with the external forms of on-chip coil of data carrier chip or data carrier module mounted on the antenna coil part" means that the form of portions 111*p* of densely formed antenna lines accords with at least two or three sides more than a half of sides of the external forms of on-chip coil.

By the way, a rectangle drawn by dotted line designated "F" is the external form of data carrier chip or data carrier module, wherein this external form is expressed slightly larger than the external form of coil itself of chip.

Then, the object of "providing with portions 111*p* of densely formed antenna lines in portions of antenna coil parts 111" is to increase magnetic flux density in the portions of densely formed antenna lines corresponding to the position of coil of IC chip wherein an end portion of antenna coil part 111 is formed with a portion in which a part of wire pattern is densely formed so as to converge into the shape of "コ" as shown in FIG. 2.

Data carrier chip comprised of IC chip and on-chip coil forms a first resonance circuit, while antenna coil part 111 and capacitor pattern 112 forms a second resonance circuit. Resonance is produced in the second resonance circuit according to signal transmitted from external reader/writer and the signal is sent to the IC chip through the first resonance circuit. Further, resonance is produced in the second resonance circuit according to signal transmitted from on-chip coil and the signal is sent to the external reader/writer by the produced resonance. In the case of data carrier module, sending of signal to the external reader/writer is carried out in the same manner as in data carrier chip.

Capacity coupling of the antenna coil part and capacitor patterns connected with internal terminal and external terminal of the antenna coil part forms a resonance circuit. Accordingly, the step for connecting between the upper layer pattern and the lower layer pattern through a through hole is unnecessary. Therefore, a data carrier device can be produced with high yield and low cost.

Further the abovementioned form of antenna coil (particularly the form of an area for mounting chip) makes possible to provide a wider pad for connecting the upper layer pattern with the lower layer pattern. For example, a use of one capacitor pattern as pad for connection makes the technique of connection such as the forming of a fine through hole unnecessary.

The form of whole the antenna coil is not limited to a long shape as shown in FIG. 2. Antenna coil may be formed into rectangle or circle. Further, an area for mounting a chip of "portion of dense antenna lines" is not restricted to that with the shape projecting toward the outside of antenna coil. An area for mounting a chip may be formed into that with the shape entering the inside of antenna coil.

Figure 3:
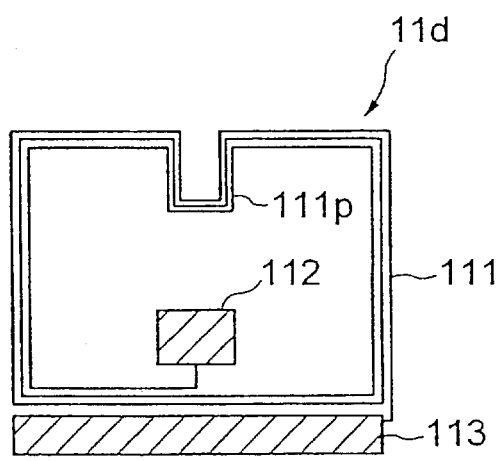
FIG. 3 is a view of one example of chip mounting part formed into a concave form inside an antenna coil part.
Figure 3:
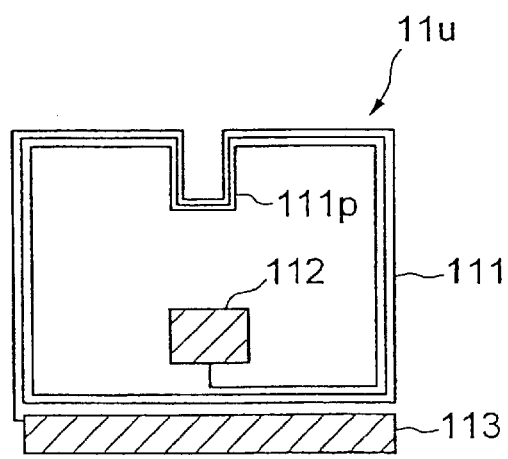

FIG. 3 is a view showing an example in which an area for mounting a chip is formed into that with the shape entering the inside of antenna coil, wherein lower layer pattern 11*d* shown in FIG. 3(A) and upper layer pattern 11*u* shown in FIG. 3(B) are juxtaposed on left and right sides in the same manner as in FIG. 2.

Such formation of area 111*p* for mounting a chip into a type projected toward the outside of the antenna coil part or a type entering the inside of the antenna coil part enables for an internal terminal of the antenna coil to be arranged outside an area for mounting a data carrier chip or a data carrier module. Accordingly, a data carrier device of the present invention has the advantage of the work for forming a through hole at the center of fine circuit of chip being unnecessary.

(Second Mode of the Present Invention)

The external form of whole the antenna coils is not restricted to that in which the external form of the upper layer pattern almost accords with the external form of lower layer pattern seeing in the vertical direction. One antenna coil may be engaged with another coil pattern outward or inside another coil pattern.

Figure 4:
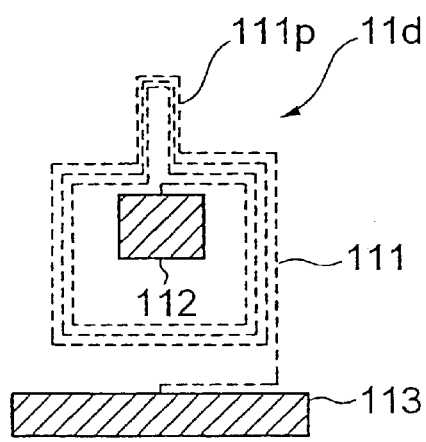
FIG. 4 is a view showing the form of antenna in a second mode of the present invention.
Figure 4:
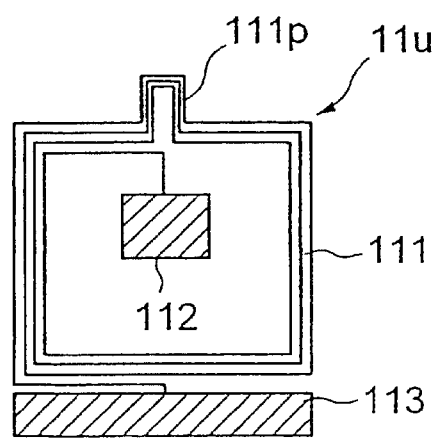
Figure 4:
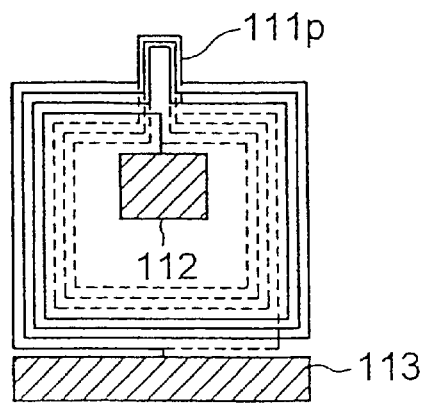

FIG. 4 is a view for showing the form of antenna of the second mode of the present invention, wherein the figure shows an example in which antenna coil patterns of the upper and lower layers are engaged with each other. A case shown in the figure is an example in which the upper layer pattern 11*u* shown in FIG. 4(B) is engaged with the lower layer pattern 11*d* outside the lower layer pattern 11*d* shown in FIG. 4(A). FIG. 4(*c*) shows a state where the upper and lower layer patterns are put on both sides of the antenna sheet. In this case, capacitor patterns 112, 113 and areas 111*p* for mounting a chip in upper layer and lower layer are formed to overlap each other through the antenna sheet in the same manner as a case shown in FIG. 2.

When a data carrier device is produced in such a manner that antenna coils of upper layer and lower layer are laid not to almost overlap each other, the effect of stray capacity can be reduced as compared with a case where antenna coils of upper layer and lower layer are laid to overlap each other through the antenna sheet, so that design of antenna is facilitated. Further, it is cancelled that resonance frequency is affected by the effect of stray capacity to greatly be shifted.

On the contrary, when design it is desired to design so as to increase the stray capacity of whole the circuit, the first mode of the present invention is advantageous.

Figure 10:
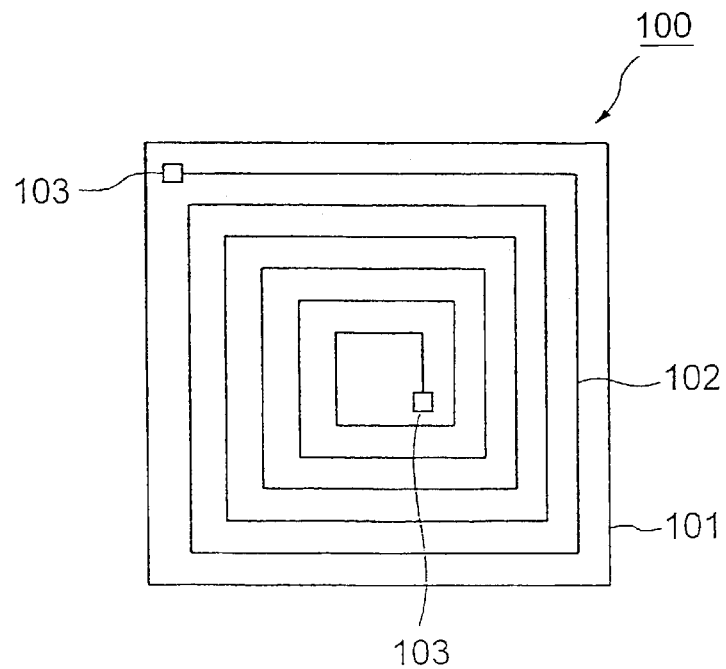
FIG. 10 is a conceptual view of a data carrier chip taking the form of on-chip coil.

A data carrier chip with on-chip coil is explained. FIG. 10 shows a conceptual view of data carrier chip taking the form of on-chip coil.

Referring to FIG. 10, a data carrier chip 100 comprises an antenna coil 102 formed into the rectangular coil on a substrate of conventional semiconductor device 101 so as to give the function of communication to IC chip, wherein the antenna coil 102 is provided with a pad 103 for connecting the antenna coil with IC chips at both terminals of the antenna coil.

A case of data carrier module is in the same manner as in the data carrier chip. However, there is a difference in a point that IC chip and antenna coil produced separately are connected with each other so as to form module, wherein the IC chip and the antenna coil are not formed on the same semiconductor substrate. However, other effect is the same.

A data carrier chip with on-chip coil itself has the function of communication. The object of mounting of data carrier chip on a booster antenna as in a non-contact data carrier device of the present invention is to increase the function of communication of chip with very small area antenna.

The first and the third non-contact data carrier devices are non-contact data carrier modules with data carrier chip, and the second and the fourth data carrier devices are non-contact data carrier devices with data carrier module.

Antenna line of data carrier chip or data carrier module is integrated with high density, wherein width of line and density of lines of antenna coil 102 do not correspond to the "portion 111p of densely formed wire pattern" of a non-contact data carrier device 10. However, providing the external form of the portion of antenna coil part and the external form of coil of the data carrier chip substantially the same contributes to increase the efficiency of magnetic connection between the chip and the portion of densely wire pattern.

The form of portion of antenna coil of data carrier chip or data carrier module 100 is not restricted to rectangle. The form of antenna may be formed into circle or other form, wherein it is needed to set the external form of "the portion of densely formed wire pattern" to semicircle or other shape.

Figure 5:
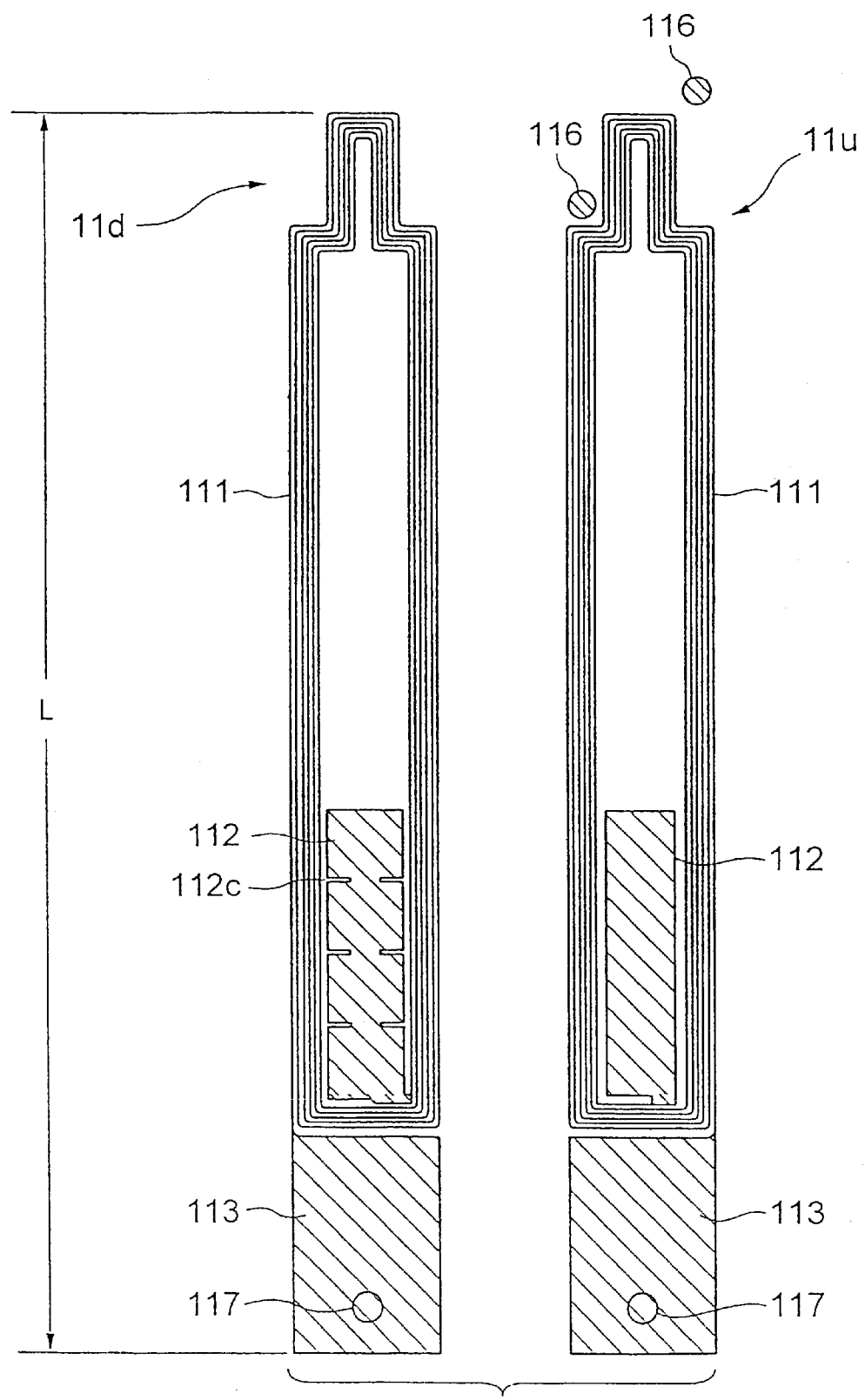
FIG. 5 is a view showing another example of an upper layer pattern and a lower layer pattern formed into an antenna sheet.

FIG. 5 is a view showing another example of upper layer pattern and lower layer pattern formed on an antenna sheet, wherein upper layer pattern 11u and lower layer pattern 11d are juxtaposed on right and left sides in the same manner as in FIG. 2.

The upper layer pattern and the lower layer pattern shown in FIG. 5 have antenna coil parts 111 and capacitor patterns 112, 113, respectively, in the same manner as in FIG. 2. However, the mode shown in FIG. 5 differs from the mode shown in FIG. 2 in the point that the lower layer pattern 11d has capacitor pattern 112 provided inside antenna coil part 111 of the lower layer pattern 11d with nicks 112c in such a manner that the adjustment of wavelength (tuning) is possible.

When the adjustment of capacity is carried out by cutting a continuous part of capacitor pattern between right and left nicks 112c of capacitor pattern 112 from the side of forward edge of capacitor pattern 112, nicks 112c are provided in capacitor pattern 112 in order to facilitate the cutting out a part of capacitor pattern 112 and to use the nicks as a kind of scale of unit amount of adjustment. As a result, the adjustment of capacitor capacity is made in order to obtain a good state of communication by finely adjusting resonance frequency. Nicks 112c may be provided in any of the upper layer pattern and the lower layer pattern. However, it is advantageous to provide nicks on the side of face where the cut takes place. If any of capacitor patterns 112, 113 are cut, capacitor capacity can be reduced. However, cutting of only one capacitor pattern is difficult on the contrary since capacitor patterns are formed on thin layer films. Cutting of continuous part of between right and left nicks is carried out by means of drill or cutter, wherein cutting by laser beam makes possible to cut the continuous part without injuring the outer surface of capacitor pattern.

If any one of two of capacitor patterns provided inside or outside the antenna coil part are formed into the form in which the adjustment of wavelength is possible in such a manner, a change in micro wavelength produced by a change in conditions of production can be adjusted.

Further, the mode shown in FIG. 5 is characterized in that circular alignment marks 116 are provided for "the portion of dense antenna lines" on which data carrier chip or data carrier module is mounted. When data carrier chip is mounted on the portion of dense antenna lines, for example, by means of mounting equipment such as flip chip bonder, wherein the chip is held to mounting equipment with locating the chip to the mounting equipment, image processing made by photographing the alignment mark 116 makes possible to mount the chip accurately at the fixed position.

Antenna sheet can be also used under the state where capacitor pattern of upper layer and capacitor pattern of lower layers are connected with each other. In this case, outward condenser patterns of upper layer and lower layer are connected through a through-hole going through areas of the upper layer and lower layer corresponding to the outward capacitor pattern, for example positions 117 shown in FIG. 5 by evaporation and others. Thereby, capacitor patterns of upper layer and lower layer are short-circuited so that the capacitor patterns lose the function of capacitor.

In case of both capacitor patterns being short-circuited, amount of capacity of resonance circuit can be increased, which enables for whole the antenna pattern to be formed into a small form.

Figure 6:
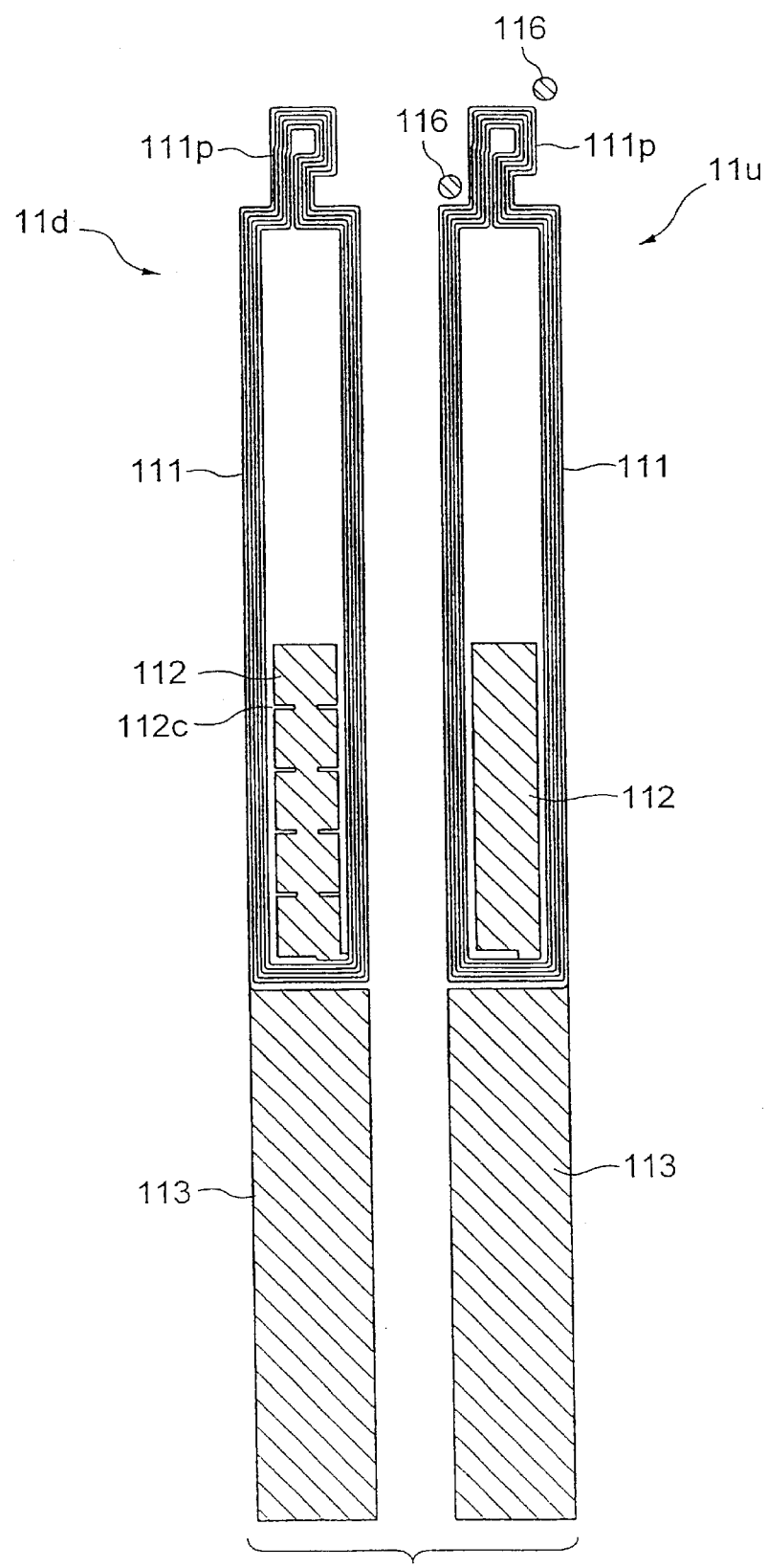
FIG. 6 is a view showing further another example of an upper layer pattern and a lower layer pattern formed into an antenna sheet.

FIG. 6 is a view showing further another example of upper layer pattern 11u and lower layer pattern 11d, wherein the upper layer pattern 11u and lower layer pattern 11d are juxtaposed on right and left sides in the same manner as in FIG. 2.

Figure 7:
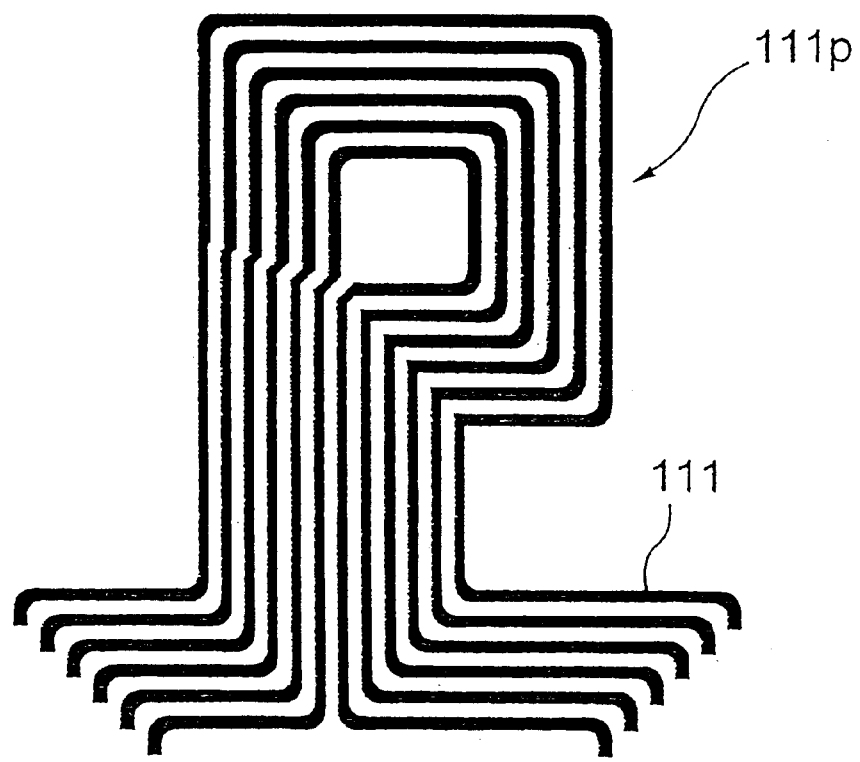
FIG. 7 is a partially enlarged view of FIG. 6.

The mode shown in FIG. 6 has antenna coil parts 111 and capacitor patterns 112, 113 in the same manner as in FIG. 2. However, the mode shown in FIG. 6 differs from the mode shown in FIG. 2 in the point that portion 11p for mounting a chip is formed into quadrangle with four sides as shown in FIG. 7 which is a partially enlarged view.

Figure 8:
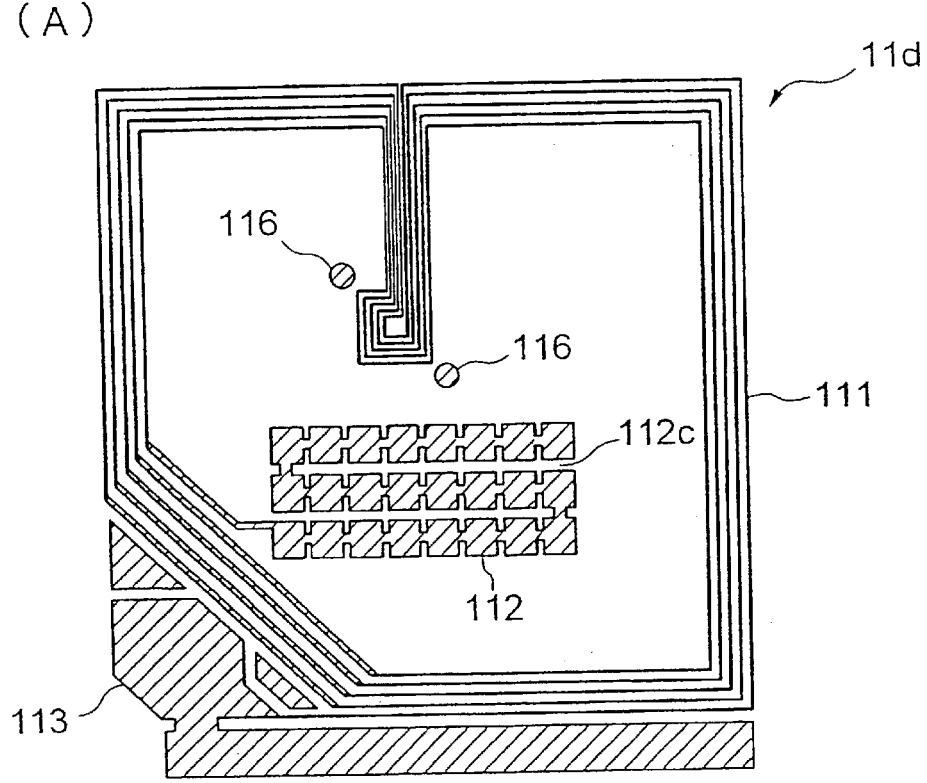
FIG. 8 is a view of another example of chip mounting part formed into a concave form inside an antenna coil part.
Figure 8:
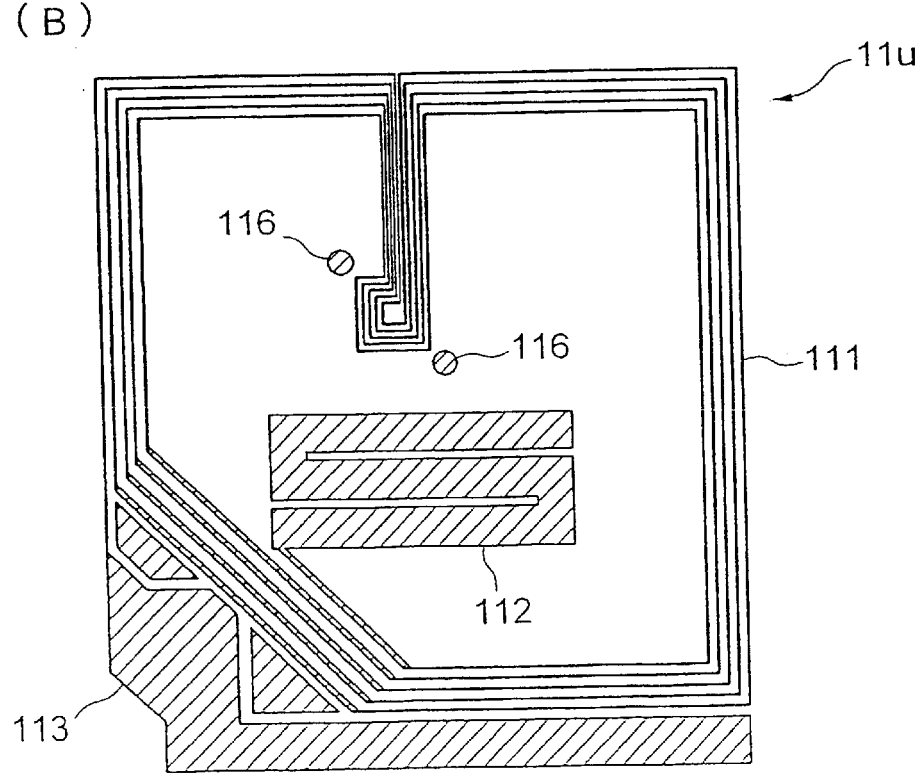
Figure 9:
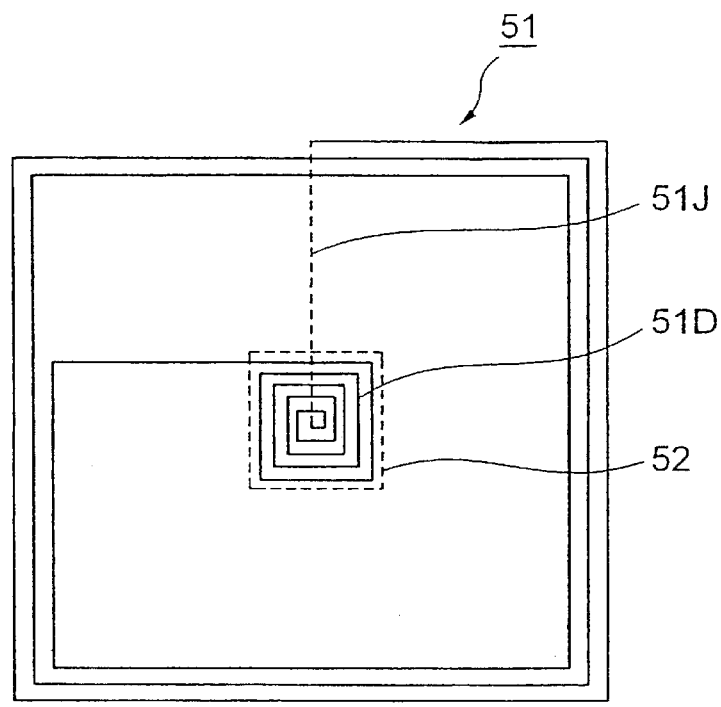
FIG. 9 is an explanatory view of a conventional example of a non-contact data carrier device with on-chip coil.

FIG. 8 is a view showing an example in which portion for mounting a chip is provided inside antenna coil part and the portion for mounting a chip is formed into a quadrangle with four sides, wherein lower layer pattern 11d shown in FIG. 8(A) and upper layer pattern 11u shown in FIG. 8(B) are shown with being juxtaposed on upside and downside.

The non-contact data carrier device comprises resonance circuit formed of antenna coils and capacitors, which sends and receives radio wave with a given frequency. Generally, bands of frequencies of 125 kHz (medium wave), 13.56 MHz, and 2.45 Ghz(micro wave) can be used, wherein it is said that in case of 125 kHz, the distance of communication is about 2 cm and in case of 13.56 MHz, the distance of communication is about 20 cm. Actual distance changes greatly depending on the area of antenna and output power of reader/writer. In case of data carrier of with the area of 50 mm×50 mm formed of conventional chip for antenna, the distance of communication of 59 to 60 cm can be obtained.

(Example)

An non-contact data carrier device was made experimentally using a substrate composed of polyethylene terephthalate having a thickness of 25 $\mu$m (Manufactured by TORAY Industries Inc.) and copper foils having a thickness of 30 $\mu$m laminated on both sides of polyethylene terephthalate.

First, casein resist was applied on both surfaces of copper foils and dried. Then, the casein resists applied on both sides of substrate were exposed through masks with a pattern of antenna coil parts and capacitor patterns with six turns of antenna coil and the total length of pattern L=45 mm shown in FIG. 5 disposed on both sides of substrate with precisely locating the positions of both the masks to each other, so that both the patterns were printed on the casein resist. Then, the exposed casein resists were developed to get patterns of resist. Thereafter, copper foils were etched through the patterns of resist by solution of iron (II) chloride so that the resists of area except part corresponding to the antenna coil parts and capacitor patterns was dissolved and removed.

The width of line of wire pattern of antenna coil formed by etching was 80 μm. Data carrier chip taking the form of on-chip coil with the size of 3 mm×3 mm was mounted on a part formed into the shape of "⊐" of the antenna coil with precisely locating the position of data carrier chip to the position of the part formed into the shape of "⊐". The chip was secured to the antenna coil by heating the chip while the chip being pressed to the antenna coil through adhesives to harden the adhesives.

Finally, PET films having a thickness of 20 μm were laminated on both sides of substrate as the upper and lower protective sheets 21, 31, so that a non-contact data carrier device shown in FIG. 1 was formed.

Reader/writer could receive/send radio wave with frequency of 13.56 MHz from/to the formed non-contact data carrier device through the distance of communication of about 3 cm even in case of weak output.

INDUSTRIAL APPLICABILITY

Since a non-contact data carrier device of the present invention has an antenna coil having the above-mentioned form of antenna, the technique of connection such as forming a through-hole in fine part can be made unnecessary by changing the mounting part of chip from the form of wound line to the shape of "⊐" thereof.

Further, capacitor patterns provided at both terminals of antenna coil (outside and inside of antenna coil) makes unnecessary to connect the upper and lower layer patterns by means of the technique of connection such as through-hole. Accordingly, the production of antenna with high yield and with low-cost production of antenna is made possible.

What is claimed is:

1. A non-contact data carrier device comprising an upper layer pattern having an antenna coil part made of wire pattern laid spirally and capacitor patterns and a lower layer pattern having, in a same way, an antenna coil part made of wire pattern laid spirally and capacitor patterns, wherein the respective antenna coil parts have almost the same external forms, wherein the upper and lower layer patterns are disposed on a surface and a back of a dielectric layer, respectively, in such a manner that at least the external forms of the upper and lower layer patterns accord with each other so that a resonance circuit is formed, characterized in that a part of each antenna coil part includes a portion which has the shape according with the external form of coil of a data carrier chip with on-chip coil and has a densely formed wire pattern, and that the data carrier chip is mounted on one of the portions of densely formed wire pattern in such a manner that the data carrier chip partially conforms to the external form of coil of the densely formed wire pattern.

2. A non-contact data carrier device comprising an upper layer pattern having an antenna coil part made of wire pattern laid spirally and capacitor patterns and a lower layer pattern having, in a same way, an antenna coil part made of wire pattern laid spirally and capacitor patterns, wherein the respective antenna coil parts have almost the same external forms, and wherein the upper and lower layer patterns are disposed on a surface and a back of a dielectric layer, respectively, in such a manner that at least the external forms of the upper and lower layer patterns accord with each other so that a resonance circuit is formed, characterized in that a part of each antenna coil part includes a portion which has the shape according with the external form of coil of data carrier module with on-chip coil and has a densely formed wire pattern, and that the data carrier module is mounted on one of the portions of densely formed wire pattern in a manner that the form of coil of data carrier module partially conforms to the external form of the portion of densely formed wire pattern.

3. A non-contact data carrier device comprising an upper layer pattern having an antenna coil part made of wire pattern laid spirally and capacitor patterns and a lower layer pattern having, in a same way, an antenna coil part made of wire pattern laid spirally and capacitor patterns, wherein a part of each antenna coil part of the respective layer patterns includes a portion which has the shape according with the external form of coil of data carrier chip with on-chip coil and has a densely formed wire pattern, wherein the respective parts of antenna coil are formed into forms such that at least both the antenna coil parts are engaged with each other except the respective capacitor patterns and the respective densely formed wire patterns, wherein the forms of capacitor patterns and the forms of densely formed wire patterns of both the layer patterns are almost the same, wherein the upper and lower layer patterns are disposed on a surface and a back of a dielectric layer, respectively, in such a manner that the upper and lower layer patterns correspond to each other so that a resonance circuit is formed, characterized in that the data carrier chip is mounted on one of the portions of densely formed wire pattern in such a manner that the data carrier chip partially conforms to the external form of the portion having densely formed wire pattern.

4. A non-contact data carrier device comprising an upper layer pattern having an antenna coil part made of wire pattern laid spirally and capacitor patterns and a lower layer pattern having, in a same way, an antenna coil part made of wire pattern laid spirally and capacitor patterns, wherein a part of each antenna coil part of the respective layer patterns includes a portion which has the shape according with the external form of coil of data carrier chip with on-chip coil and has a densely formed wire pattern, wherein the respective antenna coil parts are formed into forms such that at least both the antenna coil parts are engaged with each other except the respective capacitor patterns and the respective densely formed wire patterns, wherein the forms of capacitor patterns and the forms of densely formed wire patterns of both the layer patterns are almost the same, wherein the upper and lower layer patterns are disposed on a surface and a back of a dielectric layer, respectively, in such a manner that the upper and lower layer patterns correspond to each other so that a resonance circuit is formed, characterized in that the data carrier module is mounted on one of the portions of densely formed wire patterns in such a manner that the data carrier module partially conforms to the external form of the portion of densely formed wire pattern.

5. A non-contact data carrier device as claimed in any of claims 1 to 4, wherein the portion of densely formed wire pattern is formed into the shape projected against the rest portion of external form of antenna coil.

6. A non-contact data carrier device as claimed in any of claims 1 to 4, wherein the potion of densely formed wire pattern is formed into the shape dented against the rest portion of external form of antenna coil.

7. A non-contact data carrier device as claimed in any of claims 1 to 4, wherein the portion of densely formed wire pattern is formed into square with four sides.

8. A non-contact data carrier device as claimed in any of claims 1 to 4, wherein two or three sides of the external form of chip coil of data carrier chip or data carrier module are formed so as to accord with the form of the portion of densely formed wire pattern.

9. A non-contact data carrier device as claimed in any of claims 1 to 4, wherein capacitor patterns are provided inside and outside antenna coil part.

10. A non-contact data device as claimed in any of claims 1 to 4, wherein the upper layer pattern and the lower layer pattern are connected with each other in capacitor pattern provided outside antenna coil part.

11. A non-contact data carrier device as claimed any of claims 1 to 4, wherein any of a capacitor pattern provided inside antenna coil part and a capacitor pattern provided outside antenna coil has the form in which the adjustment of wavelength is possible.

12. A non-contact data carrier device as claimed in claim 1 or 2, wherein the respective wire patterns laid spirally of the antenna coil part of the upper and lower layer patters are juxtaposed in the vertical direction in such a manner that the wire pattern of upper layer pattern accords with the wire pattern of lower layer pattern seeing the vertical direction.

13. A non-contact data carrier device as claimed in any of claims 1 to 4, wherein the winding direction of wound wire pattern of the antenna coil part of the upper layer pattern is reverse to that of the antenna coil part of the lower layer pattern.

14. A non-contact data carrier device as claimed in any of claims 1 to 4, wherein alignment marks for the location of data carrier chip or data carrier module to the antenna coil part are provided neighboring a portion of the antenna coil part which partially conforms to the external form of on-chip coil.

* * * * *